US011912562B2

(12) United States Patent
Perry

(10) Patent No.: US 11,912,562 B2
(45) Date of Patent: Feb. 27, 2024

(54) PERSONAL GAS HANDLE SANITARY COVER DEVICE

(71) Applicant: Freda Perry, Brookhaven, GA (US)

(72) Inventor: Freda Perry, Brookhaven, GA (US)

( * ) Notice: Subject to any disclaimer, the term of this patent is extended or adjusted under 35 U.S.C. 154(b) by 0 days.

(21) Appl. No.: 17/946,338

(22) Filed: Sep. 16, 2022

(65) Prior Publication Data

US 2023/0278854 A1 Sep. 7, 2023

Related U.S. Application Data

(60) Provisional application No. 63/317,028, filed on Mar. 6, 2022.

(51) Int. Cl.
*B67D 7/42* (2010.01)

(52) U.S. Cl.
CPC .................................... *B67D 7/421* (2013.01)

(58) Field of Classification Search
CPC ........ B67D 7/421; B67D 7/50; A41D 13/082; A41D 13/087
See application file for complete search history.

(56) References Cited

U.S. PATENT DOCUMENTS

| | | | | |
|---|---|---|---|---|
| 4,791,682 A * | 12/1988 | Herr | A41D 19/01529 2/160 |
| 4,874,151 A * | 10/1989 | Fritz | G05G 5/06 24/306 |
| 2009/0056844 A1* | 3/2009 | Schanz | B67D 7/42 141/392 |
| 2014/0263318 A1* | 9/2014 | Webster | B60K 15/0406 220/212.5 |
| 2021/0323807 A1* | 10/2021 | Brown | B67D 7/42 |

* cited by examiner

*Primary Examiner* — Timothy P. Kelly
(74) *Attorney, Agent, or Firm* — Brennan, Manna & Diamond, LLC

(57) ABSTRACT

The present invention relates to a personal gas handle device. The personal gas handle protective device is in the form of a sanitary cover capable of fitting over a gas pump handle and trigger to prevent direct contact of a user's hand with the gas pump handle and trigger for improving safety and reducing the spread of germs and bacteria. The sanitary cover has a handle cover portion for covering a portion of the handle of the gas pump, a trigger cover portion having a curved portion for covering the trigger of the gas pump. The sanitary cover can be removed and wiped for reuse and can be easily stored and carried. The sanitary cover is made of flexible plastic enabling a user to squeeze the gas pump trigger with the cover fitted over the handle and the trigger.

19 Claims, 5 Drawing Sheets

PERSONAL GAS HANDLE SANITARY COVER DEVICE

CROSS-REFERENCE TO RELATED APPLICATION

The present application claims priority to, and the benefit of, U.S. Provisional Application No. 63/317,028, which was filed on Mar. 6, 2022 and is incorporated herein by reference in its entirety.

FIELD OF THE INVENTION

The present invention relates generally to the field of personal safety devices. More specifically, the present invention relates to a novel sanitary cover for a gas handle and trigger to obviate the user from making direct contact with the unsanitary gas pump handle and trigger, improving safety and reducing the spread of germs and bacteria. The cover is reusable and flexible and can be removably fitted over a gas pump handle and trigger. The cover has a handle cover portion for covering a handle and a trigger cover portion for covering the trigger. Accordingly, the present disclosure makes specific reference thereto. Nonetheless, it is to be appreciated that aspects of the present invention are also equally applicable to other like applications, devices, and methods of manufacture.

BACKGROUND

By way of background, gas pump handles at a gas station are used for triggering the flow of gasoline. Gas pump handles are triggered by individuals for refilling gasoline in their vehicles which requires physical contact of a person with the gas pump handle. In fact, millions of vehicle owners in North America fill up their gas tanks daily. As a result, gas pump handles become contaminated, dirty, filthy, and a breeding source for contamination. Touching these contaminated handles can lead to the inevitable spread of dangerous illnesses such flu, COVID 19, and more. In fact, research studies have shown that gas pumps, followed by handles on public mailboxes, escalator rails, and ATM buttons are the top sources for public transmission of pathogens and germs.

Many individuals use ineffective means to prevent exposure to germs including cleaning gas pump handles before use such as using paper towels. Paper towels are difficult to dispose and often, individuals forget to carry paper towels. Often, individuals use a sanitizer before and after using a gas pump handle. However, sanitizers may not be carried by users, and further, sanitizers may not be effective as a user touches the gas pump handle bare handed. Additionally, individuals wash their hands but this is inconvenient as individuals may need to go to a gas station bathroom to wash their hands. Individuals desire a device and method that can prevent contamination of germs and pathogens from gas pump handles and can obviate touching of the gas pump handle.

It is also extremely difficult and time consuming for gas station staff to clean and disinfect individual gas pump handles. Therefore, gas station owners want an effective way of cleaning handles so that both consumers and their staff are protected from illnesses due to contamination.

Therefore, there exists a long-felt need in the art for a protective device that obviates a user from touching the gas handle while filling a gas tank. There is also a long-felt need in the art for a protective device that is in the form of a sanitary cover designed to use with gas pump handles. Additionally, there is a long-felt need in the art for a sanitary cover that enables users to pump gas without worry of directly touching the pump. Moreover, there is a long-felt need in the art for a protective device that eliminates the risk of spreading germs, viruses, and bacteria through the gas pump handles. Further, there is a long-felt need in the art for a sanitary device that can be sanitized and reused. Finally, there is a long-felt need in the art for a protective device that can cover the gas handle and trigger to prevent a user's direct contact with same and to improve personal safety and illness prevention.

The subject matter disclosed and claimed herein, in one embodiment thereof, comprises a personal gas handle protective device. The personal gas handle protective device fits over a gas pump handle and trigger for preventing direct contact with the unsanitary gas pump and handle, improving safety, and reducing the spread of germs and bacteria. The sanitary cover features a handle cover portion for covering a portion of the handle of gas pump, a trigger cover portion having a curved portion for covering the trigger, wherein the trigger cover portion extends vertically downward from a bottom edge of the handle cover portion. The handle cover portion functions as a barrier between a palm of a user's hand and the handle of the gas pump, and the curved portion functions as a barrier between a user's fingers and the trigger of the gas pump, thereby preventing direct contact with the unsanitary gas pump handle and trigger to improve safety and reduce the spread of germs and bacteria.

In this manner, the personal gas handle device of the present invention accomplishes all of the foregoing objectives and provides users with a flexible plastic cover capable of fitting over a gas pump handle and trigger. The device enables users to pump gas without worry of directly touching the pump and risking the spread of germs, viruses, and bacteria. The device obviates the washing of hands, cleaning of the gas pump handle and trigger, while improving personal safety and preventing illness.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a personal gas handle protective device. The personal gas handle protective device is in the form of a sanitary cover capable of fitting over a gas pump handle and trigger. The sanitary cover has a one-piece structure and comprises a handle cover portion for covering a portion of the handle of a gas pump, a trigger cover portion having a curved portion for covering the trigger, wherein the trigger cover portion extends vertically downward from a bottom edge of the handle cover portion. The handle cover portion functions as a barrier between a palm of a user's hand and the handle of the gas pump, and the curved portion functions as a barrier between a user's fingers and the trigger of the gas pump, thereby preventing direct contact with the unsanitary gas pump handle and trigger for improving safety and reducing the spread of germs and bacteria. The sanitary cover can be removed and wiped for reuse and can be easily stored and carried.

In yet another embodiment, a reusable and personal sanitary cover for a gas pump handle and trigger to obviate the user from touching the gas handle and trigger is disclosed. The sanitary cover is configured to cover the handle and trigger of the gas pump and is made of flexible plastic enabling the trigger to squeeze with the sanitary cover positioned on the handle and trigger. The sanitary cover is conformed to the shape and size of the handle and the trigger and does not slip while operating the trigger to fill gasoline into gas tanks.

In yet another embodiment, a method for preventing direct contact of a user's hand with gas pump handle and trigger is described. The method includes the steps of: providing a sanitary cover, the cover includes a handle cover portion for covering a portion of the handle of gas pump, a trigger cover portion for covering the trigger; positioning the handle cover portion on the handle to cover at least a portion of the handle; positioning a curved portion of the trigger cover portion to cover the trigger; holding the handle and the trigger by placing the palm on the handle cover portion and fingers on the curved portion; squeezing the trigger; and removing the sanitary cover for wiping and reuse.

In a further embodiment, an object of the present invention is to provide a new and improved sanitary cover of gas pumps that is capable of being manufactured at a relatively low cost in terms of both materials and labor, thereby making such sanitary covers economically available to the buying public.

Another object of the present invention is to provide a sanitary cover or personal gas handle that allows easy operation of the gas pump trigger while providing personal safety and preventing illness and contamination to eliminate the risk of spreading germs, viruses, and bacteria.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
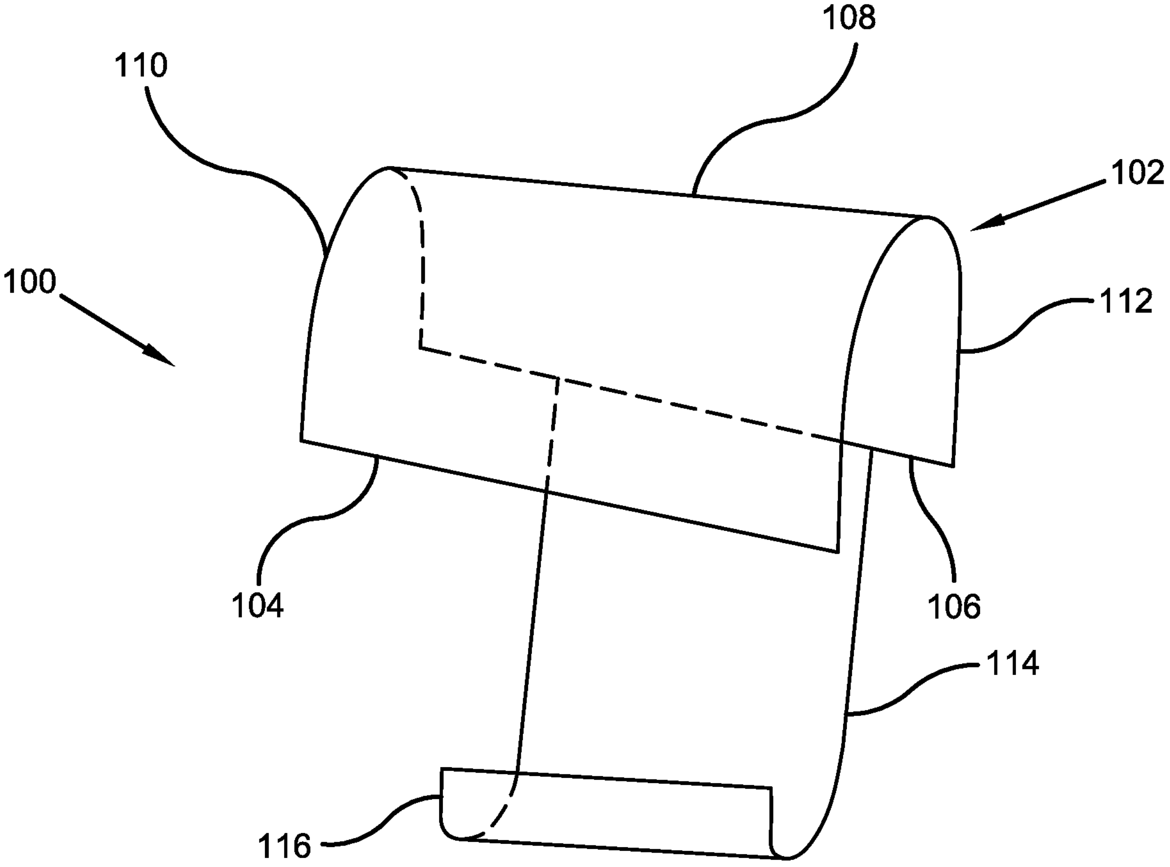
FIG. 1 illustrates a perspective view of one potential embodiment of a gas pump handle sanitary cover of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a protective device that obviates a user touching the gas handle while filling gas tank. There is also a long-felt need in the art for a protective device that is in the form of a sanitary cover designed to use with gas pump handles. Additionally, there is a long-felt need in the art for a sanitary cover that enables users to pump gas without the worry of directly touching the pump. Moreover, there is a long-felt need in the art for a protective device that reduces the risk of spreading germs, viruses, and bacteria through the gas pump handles. Further, there is a long-felt need in the art for a sanitary device that can be sanitized and reused. Finally, there is a long-felt need in the art for a protective device that can cover the gas handle and trigger to prevent a user's direct contact and improve personal safety and to help prevent illness.

The present invention, in one exemplary embodiment, a reusable and personal sanitary cover for a gas pump handle and trigger to obviate the user from touching the gas handle and trigger is disclosed. The sanitary cover is configured to cover the handle and trigger of the gas pump and is made of flexible plastic enabling the trigger to squeeze with the sanitary cover positioned on the handle and trigger. The sanitary cover is conformed to the shape and size of the handle and the trigger and does not slip while operating the trigger to fill the gasoline in gas tanks.

Figure 2:
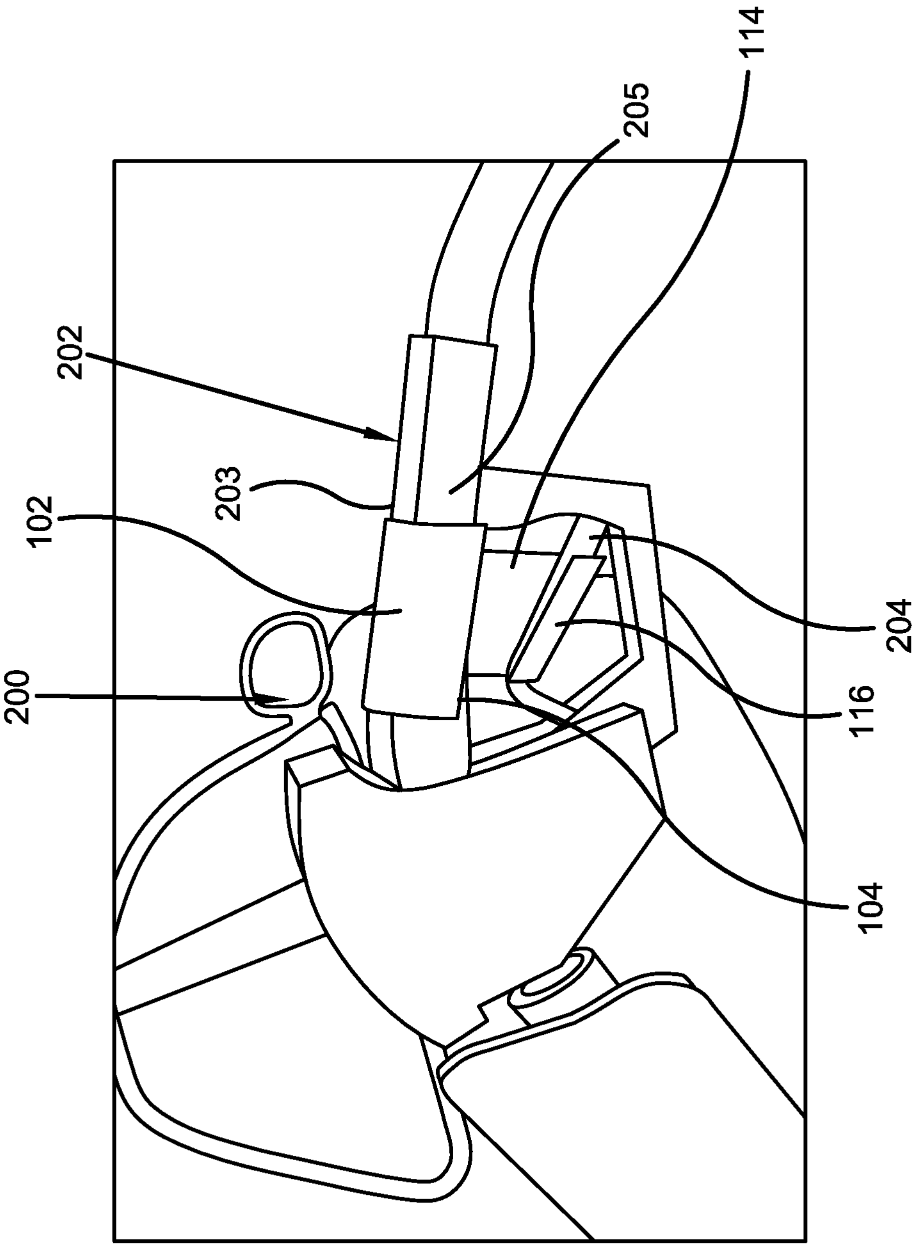
FIG. 2 illustrates a perspective view showing the sanitary cover being fit over the handle and trigger of a gas pump in accordance with the disclosed architecture.

Referring initially to the drawings, FIG. 1 illustrates a perspective view of one potential embodiment of a gas pump handle sanitary cover of the present invention in accordance with the disclosed architecture. The gas pump handle sanitary cover 100 of the present invention is designed as a flexible plastic cover capable of releasably fitting over a gas pump handle and trigger to obviate a user from touching the gas handle and trigger while pumping gas. More specifically, the cover 100 is configured to cover a portion of the handle and the trigger for preventing direct contact with the unsanitary gas pump and handle, and thereby improving safety and reducing the spread of germs and bacteria. The sanitary cover 100 has a handle cover portion 102 designed in a concave shape enabling it to fit over a gas pump handle as illustrated in FIG. 2. The handle cover portion 102 can have a length from about 2 inches to about 8 inches extending from a bottom 104 to a bottom edge 106 to fit and cover any gas pump handle. Further, a width of the handle cover portion 102 extending from a first curved end 110 to a second curved end 112 can range from about 3 inches to about 6 inches to effectively block direct contact of the hand of a user with the gas pump handle.

A trigger cover portion 114 extends vertically down from the bottom edge 106 of the handle cover portion 102 and preferably has a width about 50% of the width of the edge 106. The trigger cover portion 114 has a curved end 116 configured to be positioned at the bottom surface of a trigger to cover the trigger of the gas pump as illustrated in FIG. 2. The trigger cover portion 114 has a length from about 2 inches to about 6 inches that easily enables the portion 114 to be positioned at the bottom surface of the trigger while operating the trigger by a user. It should be noted that the handle cover portion 102 covers a portion of the handle and the trigger cover portion 114 covers the trigger thereby obviating physical contact with the handle and trigger.

The cover 100 can be easily wiped without any damage for reuse and is flexible enabling a user to adjust the curvature of both the handle cover portion 102 and the trigger cover portion 114. Further, the cover 100 is designed specifically to use with the gas pumps to avoid transmission of pathogens and germs. The cover 100 may be made from Polyvinyl Chloride, Linear Low-Density Polyethylene (LLDPE), Acrylic, Plexiglass, Flexible High-Density Polyethylene and more. The cover 100 is scratch proof and may come in different sizes and colors.

FIG. 2 illustrates a perspective view showing the sanitary cover being fit over the handle and trigger of a gas pump in accordance with the disclosed architecture. The cover 100 is designed to cover a portion of the handle 202 and trigger 204 so that a user holding the gas pump 200 does not make physical contact with the handle 202 and the trigger 204 and therefore is protected from contamination caused by germs accumulated on the publicly used handle 202 and trigger 204. In particular, the handle cover portion 102 wraps around a majority of the handle 202 from a first side surface 205, over a top surface 203, and along a second side surface (not illustrated). The curved handle cover portion 102 is positioned on the handle 202 such that the edges 104, 106 are positioned on opposite sides of the handle 202 to cover a majority portion of the handle 202. The handle cover portion 102 is positioned to cover at least the top surface of the handle such that the palm of the user when placed on the handle 202, does not physically touch the handle 202.

The curved portion 116 of the trigger cover portion 114 passes through the base of the trigger 204 and wraps around a majority of the trigger 204 such that the fingers of a user using the pump touches the curved portion 116 while being shielded from direct contact with the trigger 204. The cover 100 can be easily installed before using the gas pump 200 and can be removed and wiped for re-use. The curved configuration of the handle cover portion 102 and the curved portion 116 enable the cover 100 to easily conform to the shape and contour of the handle 202 and trigger 204, respectively. The sanitary cover 100 is lightweight and can be easily stored in a pocket for easy carry.

Figure 3:
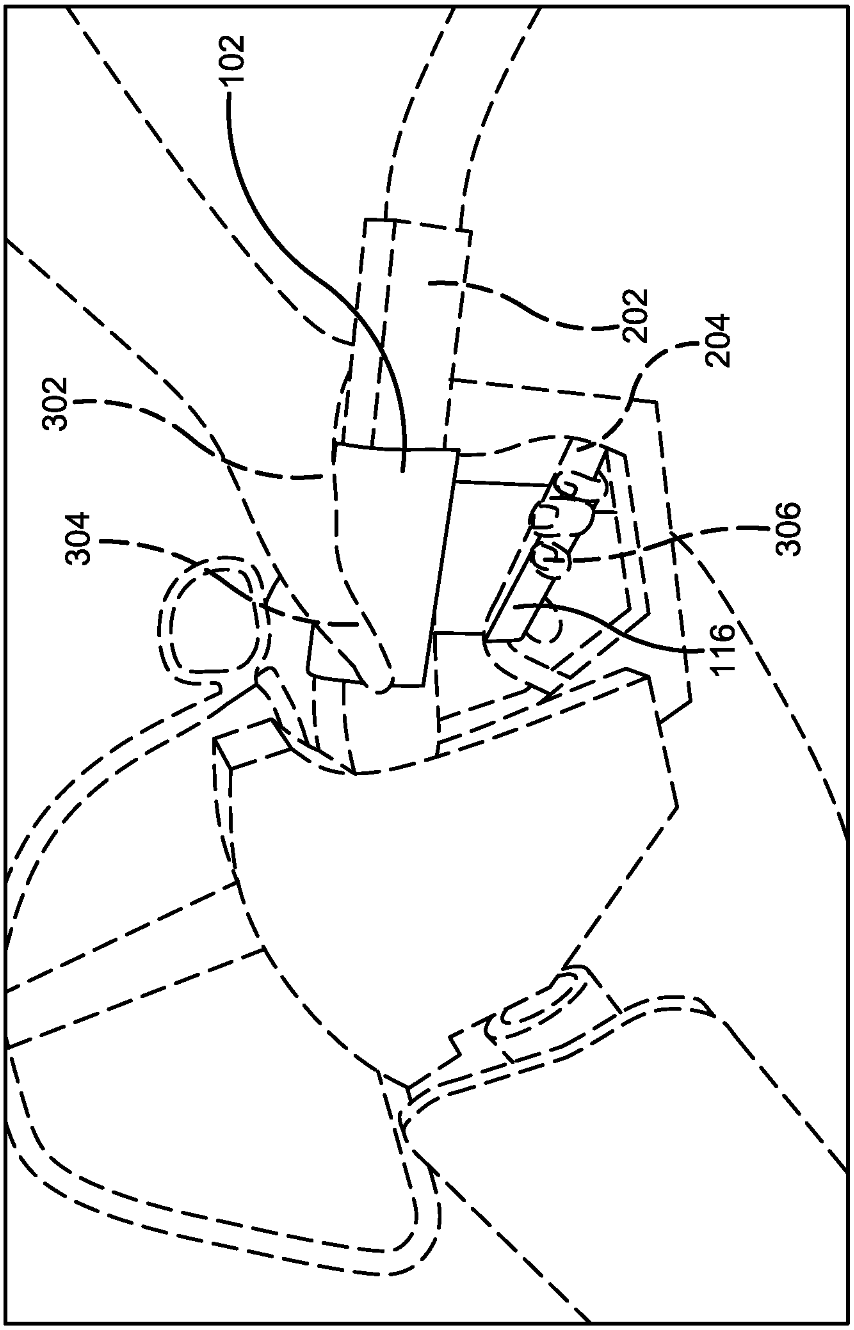
FIG. 3 illustrates a perspective view showing placement of a user's hand on the gas pump handle and trigger with the sanitary cover equipped over the gas pump in accordance with the disclosed architecture.

FIG. 3 illustrates a perspective view showing placement of a user's hand on the gas pump handle and trigger with the sanitary cover equipped over the gas pump in accordance with the disclosed architecture. As illustrated, in the present embodiment, the trigger 204 is not triggered and once the cover 100 is appropriately positioned on the handle 202 and the trigger 204, a user places his/her palm 302 and thumb 304 on the curved handle cover portion 102 and extends the fingers 306 transversely along the bottom of the trigger 204 such that the fingers 306 are positioned on the curved portion 116. The portions 102, 116 prohibit direct contact of the hand of the user from touching the gas pump and thereby enables safe use.

The flexible material of the cover 100 enables the cover 100 to easily extend and retract during operation of the trigger 204. Further, the cover 100 is a non-slip material such that the operation of filling the gas tank is smooth. It should be appreciated that the construction design of the cover 100 is designed specifically to use with gas pumps so that the users are not exposed to contaminates while performing the functions of filling a gas tank with gas.

Figure 4:
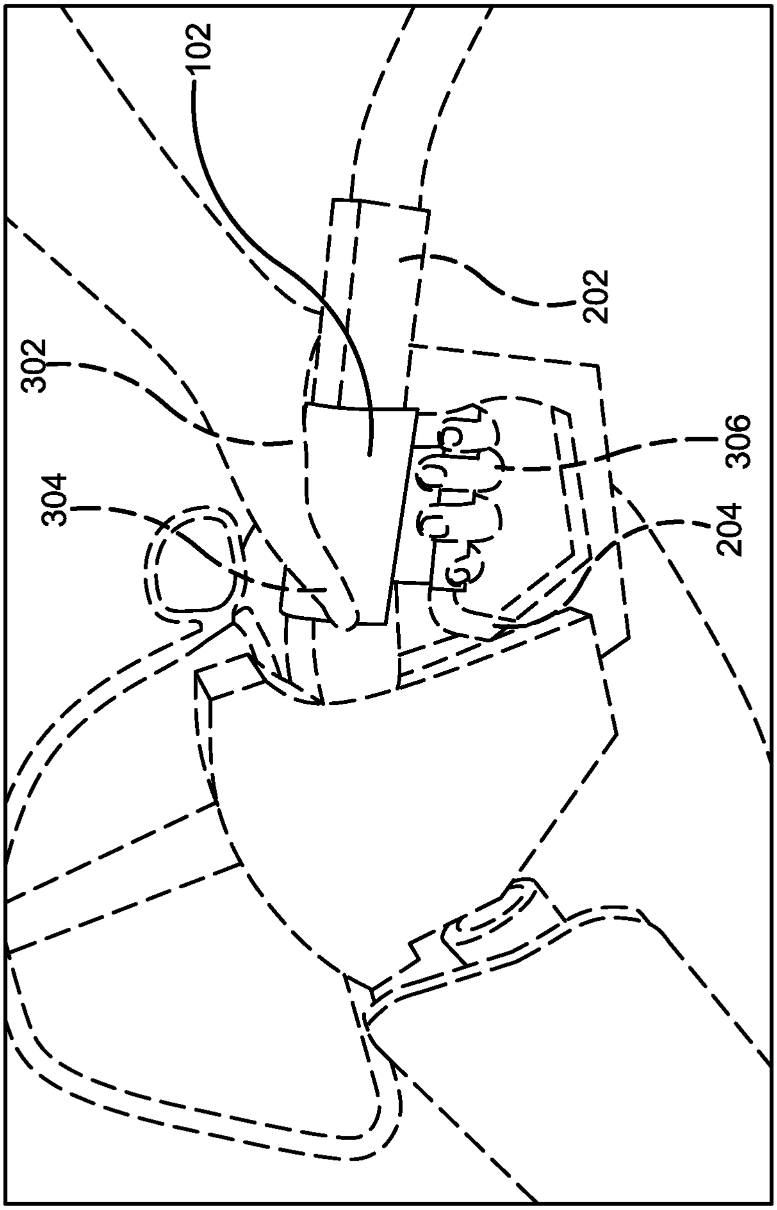
FIG. 4 illustrates a perspective view of the trigger being actuated for filling gas while using the stationary cover for preventing contamination in accordance with the disclosed architecture.

FIG. 4 illustrates a perspective view of the trigger being actuated for filling a gas tank while using the stationary cover for preventing contamination in accordance with the disclosed architecture. The advantage of the cover 100 is that it can be used during the operation of pumping gas into gas tanks while holding the trigger 204 and handle 202 of the gas pump. The trigger 204 is held by fingers 306 being positioned on the curved portion 116 such that the curved portion 116 functions as a barrier layer between the trigger 204 and the fingers 306. The flexible material of the cover 100 allows the trigger 204 to move up and down for a simple and easy operation.

Figure 5:
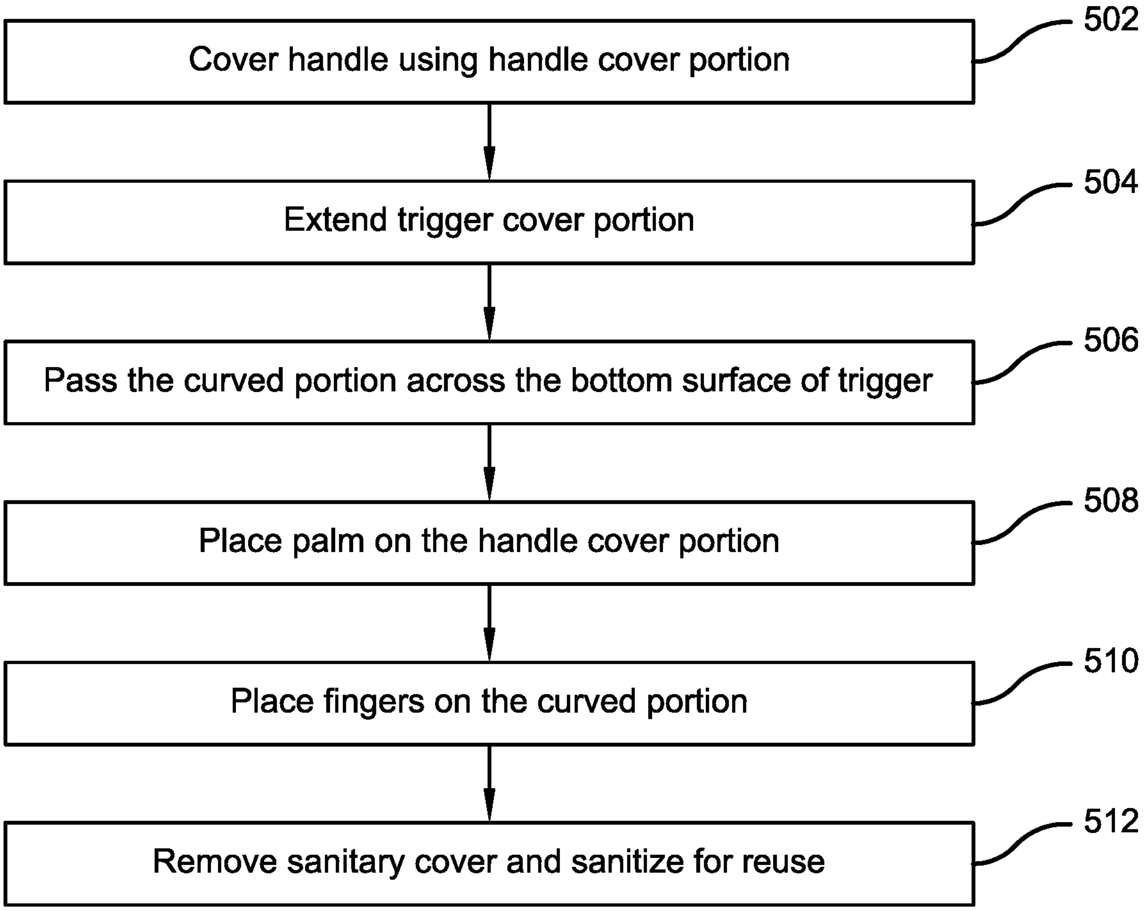
FIG. 5 illustrates a flow diagram depicting an exemplary process of using the sanitary cover in accordance with the disclosed architecture.

FIG. 5 illustrates a flow diagram depicting an exemplary process of using the sanitary cover 100 in accordance with the disclosed architecture. Initially, a portion of handle of the gas pump is covered using the handle cover portion by wrapping the handle cover portion across a top surface of the handle (Step 502). Then, the elongated part of the flexible trigger cover portion is extended by a user (Step 504). Thereafter, the curved portion is passed across the bottom surface of the trigger to cover the trigger (Step 506). Once, the sanitary cover is appropriately positioned on the gas pump, the user places his/her palm on the handle cover portion around the handle (Step 508). After that, a user's fingers are placed on the curved portion of the cover for actuating the trigger (Step 510). Once the gas tank is filled, the trigger is released, and the sanitary cover is removed and wiped for re-use (Step 512).

The sanitary cover illustrated in various embodiments of the present invention may be made from flexible, non-slip, and soft plastic. The sanitary cover may also be water resistant and scratch resistant.

It should be appreciated that the sanitary cover of various embodiments of the present invention effectively helps in better personal safety and illness prevention. The cover prevents direct contact with the unsanitary gas pump and handle, improving safety, and reducing the spread of germs and bacteria.

The personal gas handle cover may be of any suitable size and color to fulfil the needs of the users. The personal gas handle may include a design or pattern to provide additional aesthetic features. These designs or patterns could be brand names, logos, or the like.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "gas pump handle sanitary cover", "sanitary cover", "cover", and "personal gas handle device" are interchangeable and refer to the gas pump handle sanitary cover 100 of the present invention.

Notwithstanding the foregoing, the gas pump handle sanitary cover 100 of the present invention can be of any suitable size and configuration as is known in the art without affecting the overall concept of the invention, provided that it accomplishes the above-stated objectives. One of ordinary skill in the art will appreciate that the gas pump handle sanitary cover 100 as shown in the FIGS. are for illustrative purposes only, and that many other sizes and shapes of the gas pump handle sanitary cover 100 are well within the scope of the present disclosure. Although the dimensions of the gas pump handle sanitary cover 100 are important design parameters for user convenience, the gas pump handle sanitary cover 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A gas pump sanitary cover comprising:

a flexible cover having a handle cover portion and a trigger cover portion for releasably fitting over and covering at least a portion of a gas pump handle and a gas pump trigger;

wherein said handle cover portion having a concave shape for fitting over the gas pump handle;

wherein said trigger cover portion extending vertically downward from a bottom edge of said handle cover portion; and further wherein said trigger cover portion having a curved terminal end for orienting around at least a bottom surface of the gas pump trigger, and wherein said handle cover portion and the curved terminal end of said trigger cover are configured to conform to a shape and a contour of said gas pump handle and said gas pump trigger respectively.

2. The gas pump sanitary cover of claim 1, wherein said trigger cover portion having a trigger cover length from about two inches to about six inches.

3. The gas pump sanitary cover of claim 2, wherein said trigger cover portion having a trigger cover width and said bottom edge of said handle cover portion having a handle cover width, and further wherein said trigger cover width is about 50% of said handle cover width.

4. The gas pump sanitary cover of claim 3, wherein said handle cover portion having a handle cover length from about 2 inches to about 8 inches.

5. The gas pump sanitary cover of claim 4, wherein said handle cover width is from about 3 inches to about 6 inches.

6. The gas pump sanitary cover of claim 5, wherein said flexible cover is reusable.

7. The gas pump sanitary cover of claim 6, wherein said flexible cover having a material selected from a group consisting of a Polyvinyl Chloride, a Linear Low-Density Polyethylene (LLDPE), an Acrylic, a Plexiglass, and a Flexible High-Density Polyethylene.

8. The gas pump sanitary cover of claim 6, wherein said handle cover portion wrapping around a majority of the gas pump handle from a first side surface, over a top surface, and along a second side surface of the gas pump handle.

9. The gas pump sanitary cover of claim 8, wherein said trigger cover portion wrapping around a majority of the gas pump trigger.

10. A gas pump sanitary cover comprising:

a flexible cover having a handle cover portion and a trigger cover portion for releasably fitting over and covering at least a portion of a gas pump handle and a gas pump trigger;

wherein said handle cover portion having a concave shape for fitting over the gas pump handle;

wherein said trigger cover portion extending vertically downward from a bottom edge of said handle cover portion;

wherein said trigger cover portion having a curved terminal end for orienting around at least a bottom surface of the gas pump trigger;

wherein said handle cover portion wrapping around a majority of the gas pump handle from a first side surface, over a top surface, and along a second side surface of the gas pump handle; and further wherein said trigger cover portion wrapping around a majority of the gas pump trigger, and wherein said handle cover portion and the curved terminal end of said trigger cover are configured to conform to a shape and a contour of said gas pump handle and said gas pump trigger respectively.

11. The gas pump sanitary cover of claim 10, wherein said trigger cover portion having a trigger cover length from about two inches to about six inches.

12. The gas pump sanitary cover of claim 11, wherein said trigger cover portion having a trigger cover width and said bottom edge of said handle cover portion having a handle cover width, and further wherein said trigger cover width is about 50% of said handle cover width.

13. The gas pump sanitary cover of claim 12, wherein said handle cover portion having a handle cover length from about 2 inches to about 8 inches.

14. The gas pump sanitary cover of claim 13, wherein said handle cover width is from about 3 inches to about 6 inches.

15. The gas pump sanitary cover of claim 14, wherein said flexible cover is reusable.

16. The gas pump sanitary cover of claim 15, wherein said flexible cover having a material selected from a group consisting of a Polyvinyl Chloride, a Linear Low-Density Polyethylene (LLDPE), an Acrylic, a Plexiglass, and a Flexible High-Density Polyethylene.

17. A method of using a sanitary cover to protect the hand of a user during gas filling, the method comprising the steps of:

wrapping a handle cover portion of said sanitary cover across a top surface of a gas pump handle;

extending an elongated part of a trigger cover portion of said sanitary cover around a bottom surface of a gas pump trigger;

passing said trigger cover portion across said bottom surface of the gas pump trigger to cover the gas pump trigger;

placing a palm of the hand of the user on around said handle cover portion;

placing fingers of the hand of the user on a curved portion of said trigger cover portion so that said trigger cover portion wraps around a majority of the gas pump trigger; and actuating the gas pump trigger for dispensing gas into a gas tank, and wherein said handle cover portion and the curved terminal end of said trigger cover are configured to conform to a shape and a contour of said gas pump handle and said gas pump trigger respectively.

18. The method of claim 17, wherein said handle cover portion wrapping around a majority of the gas pump handle from a first side surface, over a top surface, and along a second side surface of the gas pump handle.

19. The method of claim 17, wherein said sanitary cover having a material selected from a group consisting of a Polyvinyl Chloride, a Linear Low-Density Polyethylene (LLDPE), an Acrylic, a Plexiglass, and a Flexible High-Density Polyethylene.

* * * * *